United States Patent
Zhang et al.

(12) 
(10) Patent No.: US 6,920,111 B1
(45) Date of Patent: Jul. 19, 2005

(54) MULTIPLE UPDATE FREQUENCIES FOR COUNTERS IN A MULTI-LEVEL SHAPING SYSTEM

(75) Inventors: Ming Zhang, San Jose, CA (US); Yung-Chin Chen, San Jose, CA (US); Abhijit Warkhedi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 4 days.

(21) Appl. No.: 10/394,941

(22) Filed: Mar. 21, 2003

(51) Int. Cl.⁷ .................................................. H04J 1/16
(52) U.S. Cl. ..................... 370/235; 370/392; 370/401; 370/413; 709/226; 709/249
(58) Field of Search ................................ 370/389–392, 370/395.53–395.72, 395.4, 411–413, 401, 419, 422–423, 230–235; 709/213–215, 223–229, 245, 249, 250, 253

(56) References Cited

U.S. PATENT DOCUMENTS

| | | | | |
|---|---|---|---|---|
| 5,745,490 A | * | 4/1998 | Ghufran et al. | 370/397 |
| 5,995,507 A | * | 11/1999 | Fujita | 370/395.71 |
| 6,154,459 A | * | 11/2000 | Wicklund | 370/230.1 |
| 6,205,150 B1 | * | 3/2001 | Ruszczyk | 370/412 |
| 6,477,144 B1 | * | 11/2002 | Morris et al. | 370/230.1 |
| 6,480,911 B1 | * | 11/2002 | Lu | 710/54 |
| 6,501,731 B1 | * | 12/2002 | Bleszynski et al. | 370/230.1 |
| 6,529,474 B1 | * | 3/2003 | Bonneau et al. | 370/230 |
| 6,584,517 B1 | * | 6/2003 | Raza | 370/230 |
| 6,621,791 B1 | * | 9/2003 | Davie | 370/230 |
| 6,657,955 B1 | * | 12/2003 | Bonneau et al. | 370/229 |
| 2002/0051460 A1 | * | 5/2002 | Galbi et al. | 370/412 |
| 2003/0012147 A1 | * | 1/2003 | Buckman et al. | 370/401 |

* cited by examiner

Primary Examiner—Zarni Maung
Assistant Examiner—Van Kim T. Nguyen

(57) ABSTRACT

Methods and devices for controlling traffic in a multi-level system are described. A first counter associated with a first node in a first level of the system is incremented. A second counter associated with a second node in an upstream level of the system is incremented. The first counter is incremented more frequently than the second counter.

29 Claims, 4 Drawing Sheets

500

510
INCREMENT A FIRST COUNTER FOR A NODE IN A FIRST LEVEL OF A SYSTEM

520
INCREMENT A SECOND COUNTER FOR A NODE IN ANOTHER LEVEL OF THE SYSTEM, WHEREIN THE FIRST COUNTER AND THE SECOND COUNTER ARE INCREMENTED AT DIFFERENT FREQUENCIES

MULTIPLE UPDATE FREQUENCIES FOR COUNTERS IN A MULTI-LEVEL SHAPING SYSTEM

TECHNICAL FIELD

Embodiments of the present invention pertain to networks. Specifically, embodiments of the present invention pertain to regulating traffic in a network.

BACKGROUND ART

In a network system, the resources (e.g., routers, switches, bandwidth, etc.) are finite in quantity. When the flow of data packets through the system is high, congestion can occur.

"Jitter" can be defined as the difference in time between when a data packet is ideally transmitted and the time at which the data packet is actually transmitted. "Burstiness" refers to the sending of data packets in bursts; that is, a number of data packets are sent at the same time or back-to-back over a short time interval, followed by an interval of significantly less activity. It is desirable to minimize jitter and burstiness by controlling traffic in a system.

One means for controlling or regulating traffic in a system is known as traffic shaping. A shaper delays excess traffic using a queuing mechanism to hold and delay packets. One type of queuing mechanism is commonly known as a token bucket mechanism. Speaking metaphorically, tokens are put into the bucket at a certain rate. The bucket has a specified capacity of tokens. Each token represents permission to transmit a certain number of bits. To send a data packet of a certain size, a sufficient number of tokens must be in the bucket. If there are not enough tokens in the bucket, the data packet is buffered until enough tokens are accumulated. When the data packet is sent, the number of tokens corresponding to the size of the packet is subtracted from the bucket. In essence, a token bucket is a counter that is increased by one count in each update interval, then decreased by one or more counts when a data packet is sent.

Consider a multi-level system. For simplicity, a three-level system is described, in which the nodes at the highest (downstream) level are referred to as ports, the nodes at the middle level are referred to as groups, and the nodes at the lowest (upstream) level are referred to as queues. Groups aggregate traffic from some number of queues, and ports aggregate traffic from some number of groups. The ports are coupled to a shared link (e.g., an optical cable or the like). On the shared link, there is a buffer for holding the traffic received from the ports. A token bucket is typically associated with each node in this system.

According to the prior art, the token buckets are updated sequentially (in series); that is, a token is added to a bucket at a queue node, then to another bucket at another queue node, and so on until all of the queue nodes are updated. Then a token is added to a bucket at a group node, then to another bucket at another group node, and so on until all of the group nodes are updated. The process is similarly repeated for the port nodes. Once the port nodes are updated, the update process returns to the queue nodes and is repeated. Serial or sequential updating is used instead of parallel updating because serial updating utilizes less complex control logic than parallel updating.

To send traffic, a node of the system is chosen according to some type of scheduling scheme (e.g., a round robin scheme) to determine whether the node is eligible for sending traffic to its downstream node. Each node is chosen in turn according to the scheduling scheme. Eligibility of a node is established by determining whether the node has enough tokens to allow a data packet to be sent, and whether there is a data packet to be sent. A port node can be considered an eligible candidate when it and any of its associated group or queue nodes is eligible. Similarly, a group node can be considered eligible when it and any of its associated queue nodes is eligible.

The update scheme described above helps smooth traffic through a system by buffering excess bursts as traffic enters the system (e.g., at the queue nodes). However, a problem with this update scheme is that it results in a troublesome degree of burstiness at the highest (e.g., port) level. As mentioned, each port aggregates traffic from a number of groups and queues, and each port is coupled to the shared link. Generally speaking, each port is almost always, if not always, sending traffic to the shared link at the maximum defined burst size. As such, the buffer downstream of the ports must be large enough to hold the maximum burst size. It is desirable to reduce the size of the downstream buffer; however, this is problematic unless the burst size at the ports is also reduced.

Accordingly, a device and/or method that can reduce burst size at high (e.g., port) level nodes in a network system is desirable. The present invention provides a novel solution to this and related problems.

SUMMARY OF THE INVENTION

Methods and devices for controlling traffic in a multi-level system are described. In one embodiment, a first counter associated with a first node in a first level of the system is incremented. A second counter associated with a second node in another level of the system is incremented. The first counter is incremented at a different frequency than the second counter.

In one embodiment, the multi-level system is a traffic shaping system that uses a token bucket scheme to regulate traffic through the system. According to one such embodiment, the token buckets at higher (downstream) levels of the system are updated more frequently than the token buckets at the lower (upstream) levels of the system. Here, a "higher level" refers to a port level of the system, while a "lower level" refers to a level of the system that is upstream of and feeds traffic to the port level or to another level upstream of the port level.

By increasing the update frequency for higher level nodes (e.g., port nodes), the amount of jitter at the higher level nodes decreases. In addition, the burstiness of the traffic downstream of the higher level nodes decreases. Accordingly, traffic downstream of the higher level nodes is smoothed, and the buffer downstream of the higher level nodes can be reduced in size.

In one embodiment, multiple state machines are implemented, each associated with a different level of the system, and each having a different period for incrementing (updating) the counters (token buckets) on the levels with which they are associated. By using multiple state machines, the features of the invention are accommodated without changing the state update circuitry.

These and other objects and advantages of the present invention will be recognized by those of ordinary skill in the art after having read the following detailed description of the preferred embodiments, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "incrementing" or "receiving" or "controlling" or "adding" or the like, refer to the action and processes (e.g., flowchart 500 of FIG. 5) of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
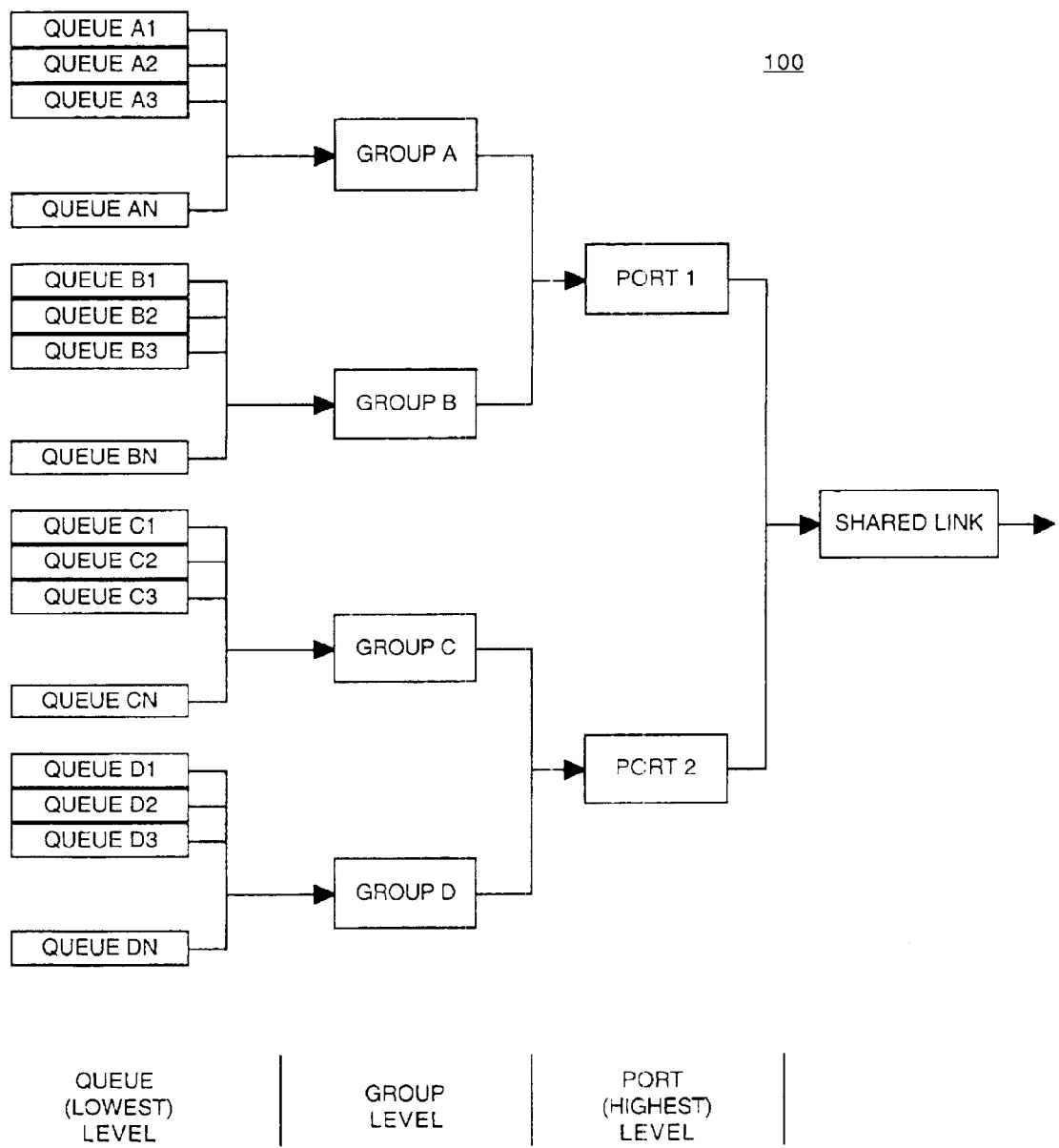
FIG. 1 is an example of a multi-level system upon which embodiments of the present invention may be implemented.

FIG. 1 is an example of a multi-level system 100 upon which embodiments of the present invention may be implemented. In the example of FIG. 1, the port level includes some number of ports (ports 1 and 2), the group level includes some number of groups (groups A, B, C and D), and the queue level includes some number of queues (queues A1, A2, ..., AN, B1, B2, ... BN, C1, C2, ..., CN, and D1, D2, ..., DN). Each queue, group or port is generally referred to herein as a node. It is appreciated that a multi-level system according to the invention is not limited to the number of ports, groups and queues illustrated by FIG. 1.

Herein, the port level is also referred to as the highest level and the queue level is also referred to as the lowest level. Traffic (information or data packets) flows from the queue level to the port level via the group level, and from the port level to the shared link. Accordingly, as used herein, a higher level can be said to be downstream of a lower level, and a lower level can be said to be upstream of a higher level.

The invention is not limited to a system configured in the manner illustrated. In the example of FIG. 1, system 100 includes three levels. However, the invention can be implemented on systems having other than three levels. In general, system 100 can be described as a multi-level system having a level that provides an interface for receiving traffic into the system 100 and a level that provides an interface to a shared link, with no layers in between those two layers, or with one or more layers in between those two layers. The shared link is shared by the highest level nodes, and can be some type of higher bandwidth cable, perhaps an optical cable.

Nodes from different levels can reside within a single device or in different devices. For example, a single device can include queues A1, A2, ... AN and group A. Similarly, nodes on one level can reside on the same or on different devices. For example, ports 1 and 2 can reside on one device or on different devices, or a single device can include queues A1, A2, ..., AN and B1, B2, ..., BN.

Figure 2:
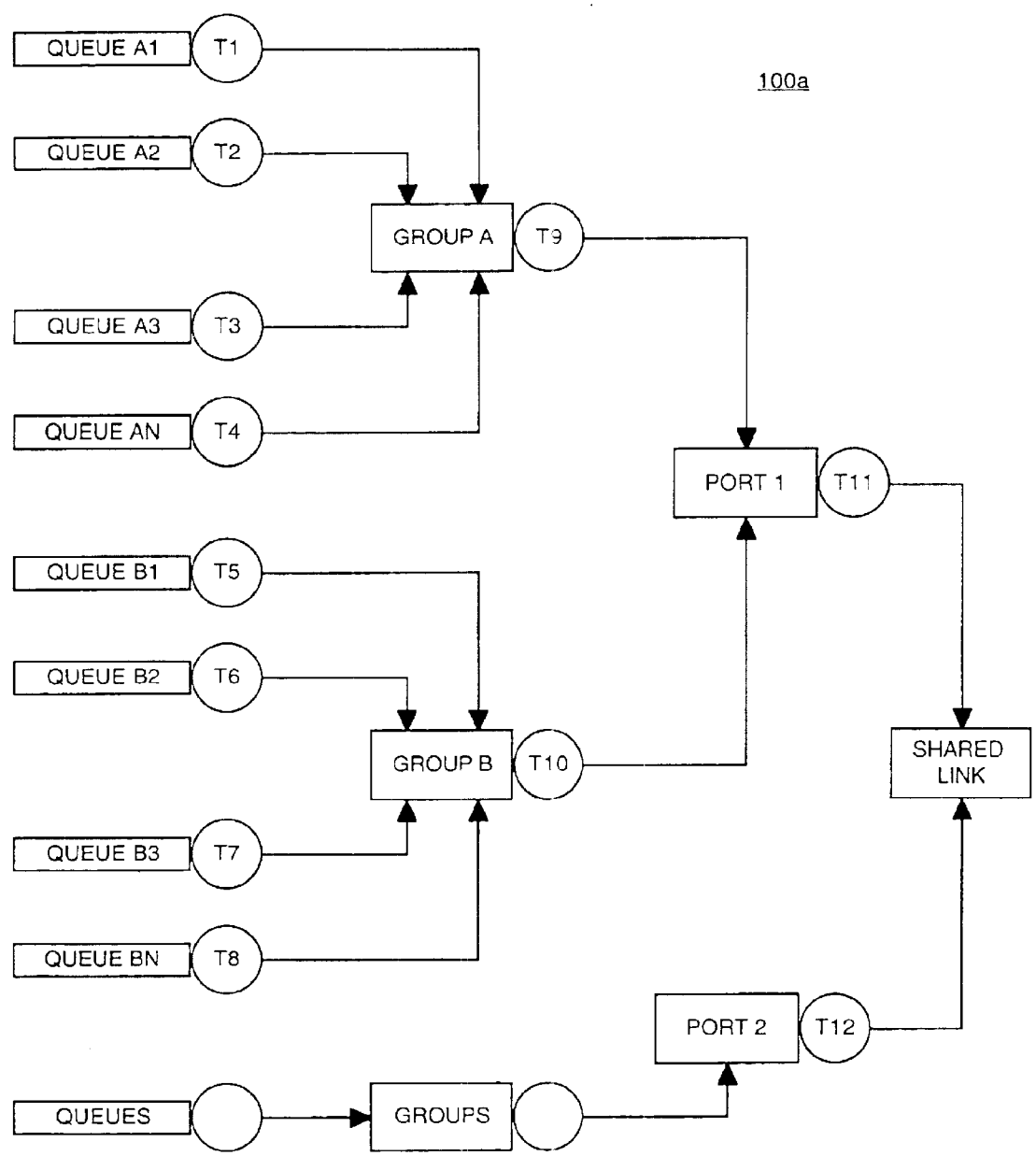
FIG. 2 provides additional details of a portion of the multi-level system of FIG. 1.

FIG. 2 provides additional details of a portion 100a of the multi-level system 100 of FIG. 1. In the example of FIG. 2, there is a counter associated with each node. However, the invention is not limited to a system that has a counter associated with each node.

In the example of FIG. 2, there is a first plurality of counters (T11 and T12) associated with the port level of nodes (e.g., port nodes 1 and 2). Similarly, there is a second plurality of counters (T9 and T10) associated with the group level of nodes (e.g., groups A and B). In addition, there is a third plurality of counters (T1 through T8) associated with the queue level of nodes (e.g., queues A1–AN and queues B1–BN). Moreover, there are counters associated with each of the nodes (queues and groups) upstream of port 2.

The counters T1–T12 are incremented at intervals in time that are referred to herein as update intervals. The frequency at which a counter is incremented is referred to herein as the update frequency. Each counter T1–T12 is incremented by one count during an update interval. Each count represents permission to transmit a specified number of bits.

In one embodiment, the counters T1–T12 are implemented as token buckets. In that case, a count and a token are equivalent terms.

In one embodiment, a buffer is associated with each node that has a counter. In another embodiment, a buffer is associated only with the nodes at the lowest level of the system 100 of FIG. 1 (e.g., the queue level). In general, buffers are associated with some or all of the nodes in the system 100. A buffer is for holding traffic (e.g., one or more data packets) at a node when the associated counter does not have a count that is high enough to permit a data packet to be sent. The buffer holds the traffic until the count at the node is sufficiently high.

According to the embodiments of the present invention, the update interval of at least one of the levels is different than that of the other levels of system 100 (FIG. 1). In one embodiment, the update interval of the counters associated with the nodes in the port level (e.g., counters T 11 and T12 associated with ports 1 and 2, respectively) is different from at least one of the lower levels (the upstream levels).

More specifically, according to the embodiments of the present invention, the counters associated with the nodes in at least one level are incremented more frequently than the counters associated with at least one of the other levels. Generally speaking, the traffic in the portion of the network immediately downstream of the level that receives more frequent updates will be smoother (less bursty). For example, if the counters T11 and T12 are incremented more frequently, the traffic along the shared link will be smoother. As another example, if the counters T9 and T10 are incremented more frequently, the traffic along the links between groups A and B and port 1 will be smoother.

It is appreciated that more than one level can be updated more frequently than the other levels. It is also appreciated that more than two different update frequencies can be used among the various levels. For example, consider a system that has three or more levels. Each level can have its own unique update interval, or the update interval of more than one level can be the same.

Figure 3:
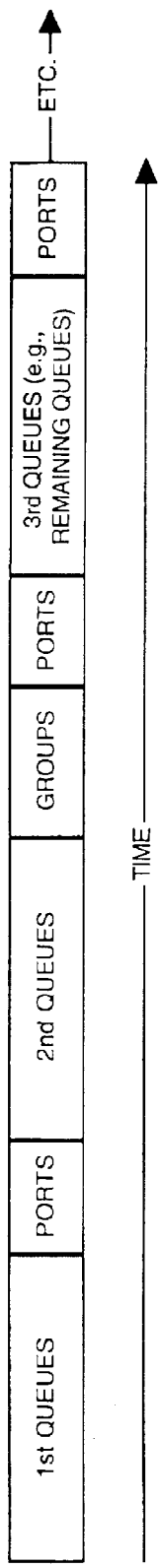
FIG. 3 is a timeline illustrating one example of a scheme for incrementing counters according to one embodiment of the present invention.

FIG. 3 is a timeline illustrating one example of a scheme for incrementing counters according to one embodiment of the present invention. It is understood that FIG. 3 represents just one example of an update scheme, and that many different update schemes are possible within the scope of the present invention.

In the example of FIG. 3, a first portion (subset) of the counters at the queue level are incremented, then all of the counters at the port level, then another portion of the counters at the queue level, then all of the counters at the group level, then all of the counters at the port level again are incremented, then the remaining counters at the queue level are incremented, and so on. The net effect is that, in this example, the counters at the port level are incremented more frequently than the counters at the queue level and at the group level. In fact, in the example, all of the counters at the port level are incremented more than one time before all of the counters at the queue level are incremented once.

There are advantages to incrementing the counters at the port level more frequently, as in the example above. The burst size associated with the ports is reduced, meaning that traffic downstream of the ports is smoother. Also, smaller burst sizes means that the size of the buffer on the shared link can be reduced. The amount of jitter at the port levels is also reduced. There is some increase in jitter at the upstream levels (e.g., at the group and queue levels). However, because of the larger number of nodes at those levels in comparison to the smaller number of nodes at the port level, the Increase In jitter at the upstream levels is proportionally small, while the decrease in jitter at the port level is proportionally large. This is particularly true at the queue level, where there can be a very large number of nodes. In addition, because of the relatively small number of nodes at the port level, the total amount of time needed to update all of the counters does not increase significantly when the port level counters are incremented more frequently.

Figure 4:
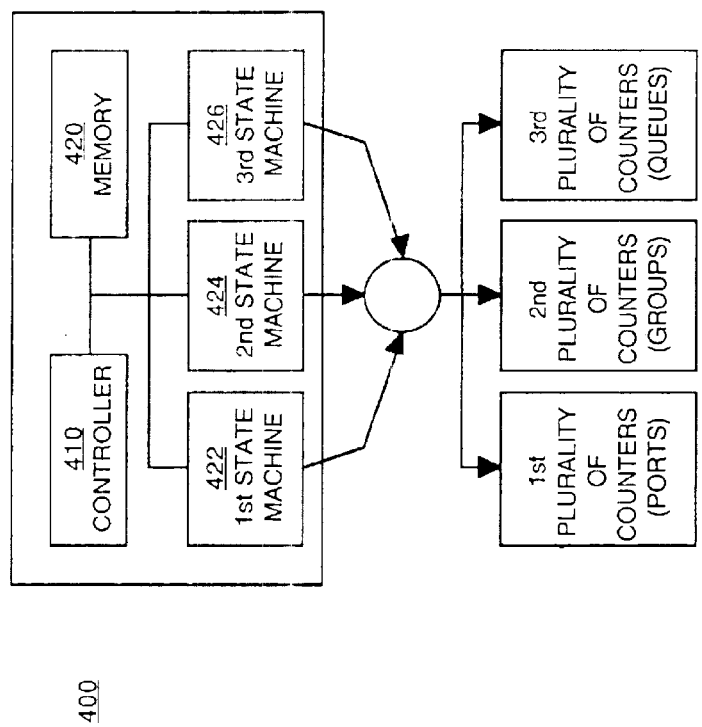
FIG. 4 is a block diagram of an exemplary device for incrementing counters according to one embodiment of the present invention.

FIG. 4 is a block diagram of an exemplary device 400 for incrementing counters according to one embodiment of the present invention. Device 400 can be incorporated into any of the nodes in system 100 of FIG. 1, or it can be a device or a portion of a device incorporating one or more of the nodes of system 100. For example, device 400 can be a switch or router, or a portion of a switch or router, that also includes one or more of the ports of system 100. Alternatively, device 400 can be a device coupled to the system 100. In general, device 400 represents a device or a portion of a device that is coupled to the counters (or token buckets) of system 100.

With reference to FIG. 4, in general, device 400 includes a controller 410 for processing information and instructions, and a memory unit 420 for storing information and instructions for controller 410. It is appreciated that device 100 may include elements in addition to, or other than, the elements illustrated by FIG. 4.

In the present embodiment, the device 400 includes a number of state machines 422, 424 and 426. The state machines 422, 424 and 426 can also be referred to as sequence generators. These state machines can exist as separate elements in device 400, or they can reside in another element of device 400 (in memory 420, for example). Each of the state machines 422, 424 and 426 can be under the control of controller 410. Alternatively, each of the state machines 422, 424 and 426 can be under the control of a respective dedicated controller, such as an application-specific integrated circuit (ASIC).

In the present embodiment, each of the counters (token buckets) associated with a particular level is in communication with the same state machine. For example, with reference to FIG. 2, the counters T11 and T12 at the port level can all be communicatively coupled to state machine 422; the counters T9 and T10 at the group level can all be communicatively coupled to state machine 424; and the counters T1–T8 at the queue level can all be communicatively coupled to state machine 426. It is appreciated that if there are more or less than three levels in a system, the number of state machines can be adjusted accordingly.

Each state machine increments its associated counters according to a prescribed sequence. That is, state machine 426 increments counters T1–T8 in a certain order; state machine 424 increments counters T9 and T10 in a certain order; and state machine 422 increments counters T11 and T12 in a certain order.

In one embodiment, each of the state machines is programmed to increment its respective counters at a prescribed frequency, independent of the other state machines. In one such embodiment, state machine 422 is programmed to increment the counters at the port level at a prescribed frequency, and state machines 424 and 426 are each independently programmed to increment the counters at the group and queue levels at another frequency (the same frequency) that is lower than the frequency instituted by state machine 422. Each of the state machines generates an update decision at its programmed frequency. When there is a conflict between decisions, then controller 410 can arbitrate between the decisions. Because in this example the Intent is to update counters at the port level more frequently, the arbitration can be arranged such that conflicts are decided in favor of state machine 422 (associated with the port level).

In another embodiment, the state machines 422, 424 and 426 are alternated between "sleep" states according to a prescribed schedule, so that only one of the state machines can generate an update decision at a time. The sleep schedule can be established to achieve the update frequency that is desired for each of the different levels in the system. For example, the state machine 422 (associated with the port level) can be awakened more frequently, allowing more frequent updates of the counters associated with the port level. State machine 422 remains awake long enough to increment the counters at the port level before returning to the sleep state. State machine 426 (associated with the queue level) is awakened at a prescribed frequency, and remains awake long enough only to increment a subset of the counters at the queue level before returning to sleep. State machine 424 is scheduled in a similar manner, depending on whether all of or only a portion of the counters at the group level are to be updated while state machine 424 is awake.

Other update schemes using multiple state machines are possible. The use of multiple state machines is advantageous in at least one respect because it permits the features of the invention to be implemented without modification of the states update circuitry. This circuitry updates state information (e.g., the count or the number of tokens) for a selected node and Its associated nodes (the upstream nodes coupled to the selected node).

Figure 5:
FIG. 5 is a flowchart of a method for incrementing counters according to one embodiment of the present invention.

FIG. 5 is a flowchart 500 of a method for controlling traffic in a multilevel system according to one embodiment of the present invention. Although specific steps are disclosed in flowchart 500, such steps are exemplary. That is, embodiments of the present invention are well suited to performing various other (additional) steps or variations of the steps recited in flowchart 500. It is appreciated that the steps in flowchart 500 may be performed in an order different than presented, and that not all of the steps in flowchart 500 may be performed. In one embodiment, the method of flowchart 500 is implemented by a device such as device 400 of FIG. 4.

In step 510 of FIG. 5, according to the present embodiment, a first counter associated with a first node in one level of a multi-level system is incremented (e.g., a token is added to the token bucket associated with the first node). The first counter controls traffic flow from the first node to a node that is downstream of the first node.

In step 520, in the present embodiment, a second counter associated with a-second node in another level of the system is incremented. This level may be upstream or downstream of the other level (the level of step 510). The second counter controls traffic flow from the second node to a node that is downstream of the second node. According to the various embodiments of the present invention, the first counter and the second counter are incremented at different frequencies.

In one example of an embodiment described by flowchart 500, the first node coincides with a port node that is coupled to a shared link that in turn is coupled to (or incorporates) an ASIC and a buffer, and the second node coincides with a node at a level that is upstream of the first node. As mentioned above, the first counter (corresponding to the first node) and the second counter (corresponding to the second node) are incremented at different frequencies. In the present example, the first counter is incremented more frequently than the second counter.

In the example above, the process of flowchart 500 can be readily extended to all of the downstream counters (the counters associated with the other nodes at the same level as the first node) and to all of the upstream counters (the counters associated with the other nodes at the same level as the second node). In one embodiment, the downstream counters are updated more than once before all of the upstream counters are updated one time.

The process of flowchart 500 can also be readily extended to systems that include more than two levels, as previously described herein.

Embodiments of the present invention are thus described. While the present invention has been described in particular embodiments, it should be appreciated that the present invention should not be construed as limited by such embodiments, but rather construed according to the below claims.

What is claimed is:

1. A method of controlling traffic in a multi-level system, said method comprising:

incrementing a first counter associated with a first node in a first level of said system, said first counter for controlling traffic flow from said first node to a node that is downstream of said first node, said first counter incremented by a fixed amount at time intervals established by an update scheme and decremented by a first variable amount that corresponds to the amount of traffic sent from said first node, said first node eligible to send traffic if said first counter exceeds said first variable amount; and incrementing a second counter associated with a second node in another level of said system, wherein said second counter controls traffic flow from said second node to a node that is downstream of said second node, said second counter incremented by a fixed amount at time intervals established by said update scheme and decremented by a second variable amount that corresponds to the amount of traffic sent from said second node, said second node eligible to send traffic if said second counter exceeds said second variable amount;

wherein said first counter and said second counter are incremented at different frequencies.

2. The method of claim 1 wherein said first node coincides with a port of a network node.

3. The method of claim 2 wherein said network node comprises a switch.

4. The method of claim 2 wherein said port is coupled to an application specific integrated circuit (ASIC) and a buffer.

5. The method of claim 1 wherein said other level is upstream of said first level, said first level receiving traffic directly from said other level.

6. The method of claim 1 wherein said other level upstream of said first level, said first level receiving traffic directly from said other level through an intermediate level.

7. The method of claim 1 wherein said first counter and said second counter are coupled to different state machines.

8. The method of claim 1 wherein said system comprises a multi-level shaping system and wherein said first and second counters comprise token buckets, wherein said incrementing said first counter and said incrementing said second counter comprise adding tokens to said token buckets.

9. A device comprising:

a memory unit; and a controller coupled to said memory unit, said controller for executing a method of controlling traffic in a multi-level system, said method comprising:

incrementing a first counter in a first plurality of counters, said first plurality of counters associated with respective nodes in a first level of said system, said first level for receiving traffic from a second level of said system, said first plurality of counters controlling traffic flow to a downstream node, said first counter incremented by a fixed amount at time intervals established by an update scheme and decremented by a first variable amount that corresponds to the amount of traffic sent from a first node associated with said first counter, said first node eligible to send traffic if said first counter exceeds said first variable amount; and incrementing a second counter in a second plurality of counters, said second plurality of counters associated with respective nodes in a level of said system that is upstream of said first level, said second plurality of counters for controlling traffic flow to a lower level of nodes, said second counter incremented by a fixed amount at time intervals established by said update scheme and decremented by a second variable amount that corresponds to the amount of traffic sent from a second node associated with said second counter, said second node eligible to send traffic if said second counter exceeds said second variable amount;

wherein said first counter is incremented more frequently than said second counter.

10. The device of claim 9 wherein said first level of said system coincides with a port of a network node.

11. The device of claim 10 wherein said network node comprises a switch.

12. The device of claim 10 wherein said port is coupled to an application specific integrated circuit (ASIC) and a buffer.

13. The device of claim 9 wherein said level that is upstream of said first level comprises a second level of said system, said first level receiving traffic directly from said second level.

14. The device of claim 9 wherein said level that is upstream of said first level comprises a third level of said system, said third level for forwarding traffic to said first level through an intermediate level.

15. The device of claim 9 wherein said first plurality of counters is coupled to a first state machine and wherein said second plurality of counters is coupled to a second state machine.

16. The device of claim 9 wherein said system comprises a multi-level shaping system and wherein said first and second pluralities of counters comprise token buckets, wherein said incrementing said first counter and said incrementing said second counter comprise adding tokens to respective token buckets.

17. A computer-usable medium having computer-readable program code embodied therein for causing a computer system to perform a method of controlling traffic in a multi-level system, said method comprising:

incrementing a first counter associated with a first node in a first level of said system, said first level for receiving traffic from a second level of said system, said first counter for controlling traffic flow from said first node to a node that is downstream of said first node, said first counter incremented by a fixed amount at time intervals established by an update scheme and decremented by a first variable amount that corresponds to the amount of traffic sent from said first node, said first node eligible to send traffic if said first counter exceeds said first variable amount; and incrementing a second counter associated with a second node in a level of said system that is upstream of said first level, wherein said second counter controls traffic flow from said second node to a node that is downstream of said second node, said second counter incremented by a fixed amount at time intervals established by said update scheme and decremented by a second variable amount that corresponds to the amount of traffic sent from said second node, said second node eligible to send traffic if said second counter exceeds said second variable amount;

wherein said first counter is incremented more frequently than said second counter.

18. The computer-usable medium of claim 17 wherein said first node coincides with a port of a network node.

19. The computer-usable medium of claim 18 wherein said network node comprises a switch.

20. The computer-usable medium of claim 18 wherein said port is coupled to an application specific integrated circuit (ASIC) and a buffer.

21. The computer-usable medium of claim 17 wherein said level that is upstream of said first level comprises a second level of said system, said first level receiving traffic directly from said second level.

22. The computer-usable medium of claim 17 wherein said level that is upstream of said first level comprises a third level of said system, said third level for forwarding traffic to said first level through an intermediate level.

23. The computer-usable medium of claim 17 wherein said first counter and said second counter are coupled to different state machines.

24. The computer-usable medium of claim 17 wherein said system comprises a multi-level shaping system and wherein said first and second counters comprise token buckets, wherein said incrementing said first counter and said incrementing said second counter comprise adding tokens to said token buckets.

25. A system for controlling traffic in a multi-level system, said system comprising:

means for incrementing a first counter means that is associated with a first node in a first level of said system, said first counter means for controlling traffic flow from said first node to a node that is downstream of said first node, said first counter means incremented by a fixed amount at time intervals established by an update scheme and decremented by a first variable amount that corresponds to the amount of traffic sent from said first node, said first node eligible to send traffic if said first counter means exceeds said first variable amount; and means for incrementing a second counter means that is associated with a second node in another level of said system, wherein said second counter means for controlling traffic flow from said second node to a node that is downstream of said second node, said second counter means incremented by a fixed amount at time intervals established by an update scheme and decremented by a second variable amount that corresponds to the amount of traffic sent from said second node, said second node eligible to send traffic if said second counter means exceeds said second variable amount;

wherein said first counter means and said second counter means are incremented at different frequencies.

26. The system of claim 25 wherein said first node coincides with a port of a network node.

27. The system of claim 25 wherein said other level is upstream of said first level, said first level receiving traffic directly from said other level.

28. The system of claim 25 wherein said other level upstream of said first level, said first level receiving traffic directly from said other level through an intermediate level.

29. The system of claim 25 wherein said first counter means and said second counter means are coupled to different state machines.

* * * * *